United States Patent
Arvelo, Jr. et al.

(10) Patent No.: US 7,675,819 B2
(45) Date of Patent: Mar. 9, 2010

(54) VOLUMETRIC PASSIVE SONOBUOY ARRAY OF POLYVINYLIDENE FLUORIDE (PVDF) WIRES

(75) Inventors: Juan I. Arvelo, Jr., Dayton, MD (US); Ronald W. Mitnick, Baltimore, MD (US)

(73) Assignee: The Johns Hopkins University, Baltimore, MD (US)

(*) Notice: Subject to any disclaimer, the term of this patent is extended or adjusted under 35 U.S.C. 154(b) by 736 days.

(21) Appl. No.: 11/548,082

(22) Filed: Oct. 10, 2006

(65) Prior Publication Data

US 2009/0213695 A1    Aug. 27, 2009

Related U.S. Application Data

(60) Provisional application No. 60/727,382, filed on Oct. 17, 2005.

(51) Int. Cl.
G01S 3/86    (2006.01)

(52) U.S. Cl. ...................................................... 367/124

(58) Field of Classification Search ................. 367/905, 367/4, 3, 124, 118
See application file for complete search history.

(56) References Cited

U.S. PATENT DOCUMENTS

| | | | |
|---|---|---|---|
| 3,889,230 A | | 6/1975 | Knott et al. |
| 3,990,123 A | | 11/1976 | Stachiw et al. |
| 4,060,792 A | * | 11/1977 | van Heyningen ............ 367/905 |
| 4,187,490 A | * | 2/1980 | Ballard et al. ............... 367/905 |
| 4,371,957 A | | 2/1983 | Sandoz et al. |
| 5,027,333 A | | 6/1991 | Halling |
| 5,117,396 A | | 5/1992 | Castile et al. |
| 5,257,243 A | | 10/1993 | DeChico et al. |
| 5,309,409 A | * | 5/1994 | Jones et al. ................. 367/103 |
| 5,469,407 A | | 11/1995 | Saunders |
| 5,812,494 A | * | 9/1998 | Medeiros ..................... 367/88 |
| 6,088,296 A | | 7/2000 | Seamen et al. |
| 6,449,215 B1 | * | 9/2002 | Shell .......................... 367/88 |
| 6,597,631 B2 | * | 7/2003 | Kitchin et al. ................. 367/4 |
| 6,657,365 B1 | | 12/2003 | Ambs |
| 6,671,230 B1 | | 12/2003 | Benjamin |

(Continued)

FOREIGN PATENT DOCUMENTS

EP    225798 A    *    6/1987

OTHER PUBLICATIONS

Gallauder et al.,On Optimal Shading for Arrays of Irregularly-Spaced or Noncoplanar Elements, Oct. 2000, IEEE Journal of Oceanic Engineering, vol. 25, No. 4, pp. 553-567.*

(Continued)

*Primary Examiner*—Dan Pihulic
(74) *Attorney, Agent, or Firm*—Albert J. Fasulo, II

(57) ABSTRACT

A sonar system for detecting underwater acoustic signals includes a plurality of hydrophone units capable of converting acoustic impulses to electrical signals, the hydrophone units being substantially vertically oriented when deployed in a body of water, and the hydrophone units occupying at least some of the positions of an M×N horizontal array. Two-dimensional Chebyshev mathematical weighting is applied to the electrical signals from the individual hydrophone units such that each individual signal from each hydrophone unit is assigned a respective weighting number and a numerical value is assigned to each individual signal corresponding to the strength of the electrical signal as adjusted by the respective weighting number.

8 Claims, 4 Drawing Sheets

U.S. PATENT DOCUMENTS

| | | | |
|---|---|---|---|
| 6,801,475 | B2 | 10/2004 | Anderson et al. |
| 7,274,622 | B1 * | 9/2007 | Huang et al. ............... 367/105 |
| 7,443,081 | B2 * | 10/2008 | Kamei et al. ............... 310/334 |
| 2002/0196707 | A1 * | 12/2002 | Kitchin et al. ................. 367/4 |
| 2003/0214880 | A1 * | 11/2003 | Rowe ........................ 367/103 |
| 2009/0213695 | A1 * | 8/2009 | Arvelo et al. ................ 367/99 |

OTHER PUBLICATIONS

U.S. Appl. No. 11/539,948, filed Oct. 10, 2006, Kitchin et al.

U.S. Appl. No. 11/548,006, filed Oct. 10, 2006, Kitchen et al.

P. Ferat et al., "Mid to High-Frequency Ambient Noise Anistrophy and Notch-Filling Mechanisms," New York, 2004.

D. Abraham et al., "Beamforming with Dominant Mode Rejection," Naval Underwater Systems Center, 1990 IEEE.

H. Cox et al., "Robust Adaptive Beamforming" IEEE Transactions on Acoustics, Speech and Signal Processing, vol. ASSP-35, No. 10, Oct. 1987.

F. T. Geyling, "Suspended Rigid Underwater Arrays," J. Hydronautics, vol. 3, No. 2, Apr. 1969.

* cited by examiner

VOLUMETRIC PASSIVE SONOBUOY ARRAY OF POLYVINYLIDENE FLUORIDE (PVDF) WIRES

CROSS-REFERENCE TO RELATED APPLICATIONS

This application claims the benefit of U.S. Provisional Application No. 60/727,382 filed Oct. 17, 2005, the contents of which are incorporated herein by reference.

STATEMENT OF GOVERNMENTAL INTEREST

This invention is made with Government support under NAVSEA Contract No. N00024-03-D-6606, awarded by the U.S. Navy. The Government has certain rights in the invention.

BACKGROUND OF THE INVENTION

1. Field of the Invention

The present invention relates to a hydrophone array, particularly hydrophone arrays for underwater acoustic sensing of subsurface marine vehicles.

2. Background of the Art

Undersea noise is well known to be highly dynamic and anisotropic. Surface-generated noise undergoes multipath propagation in the ocean waveguide arriving at the receiver at a distribution of elevation angles. Discrete noise contributions from anthropogenic and biologic sources add acute directionally in azimuth and elevation. Shallow water bathymetry also contributes by varying the distribution of the noise field across azimuth. Such anisotropy in the noise field may be exploited to increase the detection range of a passive sonar array. However, detection performance can be severely affected by nearby shipping noise through the array's beam response sidelobes.

The detection performance of low-frequency passive sonars, may be severely affected if deployed under heavy shipping conditions. Merchant ships, tankers and other anthropogenic undersea acoustic sources are very loud and they may affect detection performance even at long distances from the receiver. However, energy from the distant ships (which drops by about 6 dB/octave in source level with increasing frequency) undergoes water-column absorption and multiple bottom interactions while the energy from a nearby quiet signal will be less attenuated due to its shorter range. Therefore, at higher frequencies, clutter from distant shipping noise is expected to decrease more rapidly than the received energy level of the target. In addition, high frequency arrays are much smaller, which reduces cost and makes them attractive components of unmanned vehicles and expendable systems.

There is yet need for array designs and signal processing approaches to satisfy a number of requirements: a high-frequency passive sonar to mitigate clutter from shipping noise. The sonar system should be easy to deploy and the number of array elements should be minimized to reduce data rate and processor demand. To maximize the detection range of the system, a new design must feature a vertical aperture to exploit the ambient noise anisotropy. In addition, the system must be inexpensive for use as expendable units for multiple uses such as adjuncts to ocean observatories deployable from air or surface platforms.

SUMMARY OF THE INVENTION

A sonar system for detecting underwater acoustic signals is provided herein, the sonar system comprising: (a) a plurality of hydrophone units capable of converting acoustic impulses to electrical signals, said hydrophone units being substantially vertically oriented when deployed in a body of water, and said hydrophone units occupying at least some of the positions of an N×M horizontal array wherein N is the number of rows and M is the number of columns in the array; (b) means for applying a two-dimensional Chebyshev mathematical weighting to the electrical signals from the individual hydrophone units such that each individual signal from each hydrophone unit is assigned a respective weighting number and a numerical value is assigned to each individual signal corresponding to the strength of the electrical signal as adjusted by the respective weighting number; and (c) means for deploying said hydrophone units in the body of water.

The sonar system advantageously reduces beam side lobes which cause confusion of the acoustic signals and hamper accurate detection and directional localization of target marine vessels. Moreover, microprocessor demand is minimized.

BRIEF DESCRIPTION OF THE DRAWINGS

Various embodiments are described below with reference to the drawings wherein.

DESCRIPTION OF THE PREFERRED EMBODIMENTS

Figure 1:
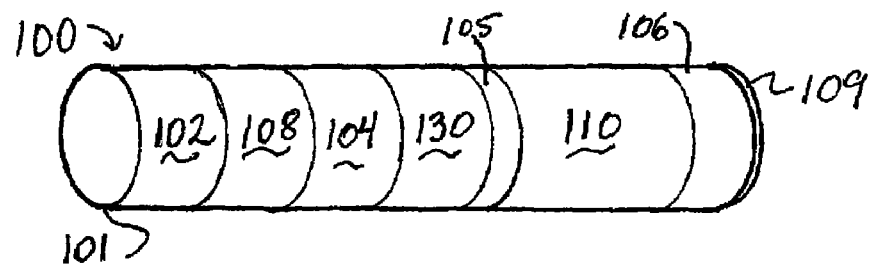
FIG. 1 illustrates a hydrophone deployment system of the invention loaded into a sonobuoy.

Referring now to FIG. 1, the hydrophone array deployment system 100 includes a float 102, battery 108, tether line 104, electronics package 130, array support 105, hydrophone array 110, and optionally weight 106, loaded into a sonobuoy canister 101. The sonobuoy canister 101 can be size A or smaller.

Figure 2:
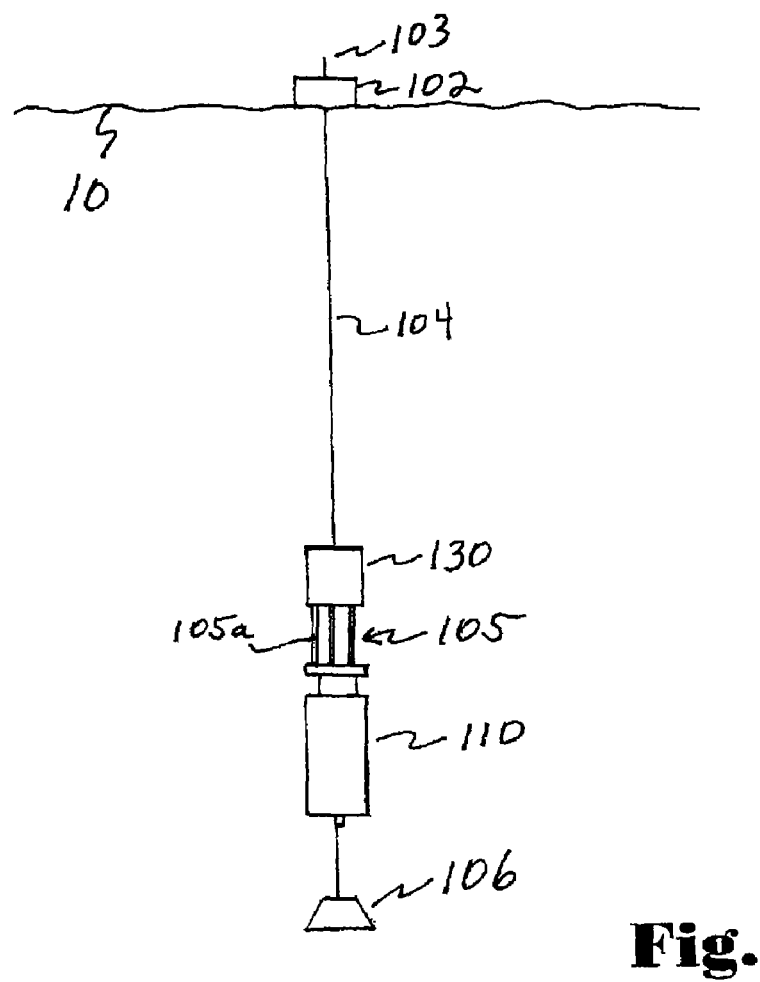
FIG. 2 illustrates the deployed system in a body of water.

Referring also now to FIG. 2, the system 100 is shown deployed in a body of water 10. Deployment can be accomplished by, for example, dropping system 100 into the water 10 by airplane, surface vessel, or any other suitable means. Jettison of the contents of the sonobuoy canister 101 can be accomplished by various means such as the impact of the sonobuoy into the water. Alternatively, a battery 108 (e.g., seawater activated battery) can power the ejection of the contents by, for example, firing a squib. Also, back plate 109 can be jettisoned (by water impact, firing a squib, etc.) to allow the hydrophone array to descend to the proper depth. Float 102 remains at the surface of the body of water and preferably includes a transmitter with antenna 103 and the appropriate battery-powered electronics for converting the electrical signals from the hydrophones into radio waves for wireless transmission to a remote receiver. The transmitter 103 is preferably powered by battery 108. Tether 104 allows the hydrophone array 110 to descend to a predetermined depth. Tether 104 can typically range up to 250 feet in length, for example. Electronics package 130 increases the power of the electrical signal from the hydrophones for transmission to the transmitter and also includes a microprocessor for converting analog to digital signals and performing the calculations described below. Electronic package 130 can also include a compass to facilitate geographic orientation of the hydrophone array 110. Weight 106 can optionally be included to facilitate deployment of the hydrophone array 110. Support system 105 includes two to four rigid connecting rods 105a to maintain the hydrophone array 110 in a fixed orientation with respect to the electronics package 130.

The system 100 is "passive." Active sonobuoy systems emit acoustic signals into the water and listen for the return echo. Passive systems merely listen for sounds made by underwater craft, e.g., power-plant, propellers, door closings or other mechanically generated or human generated noise.

Figure 3:
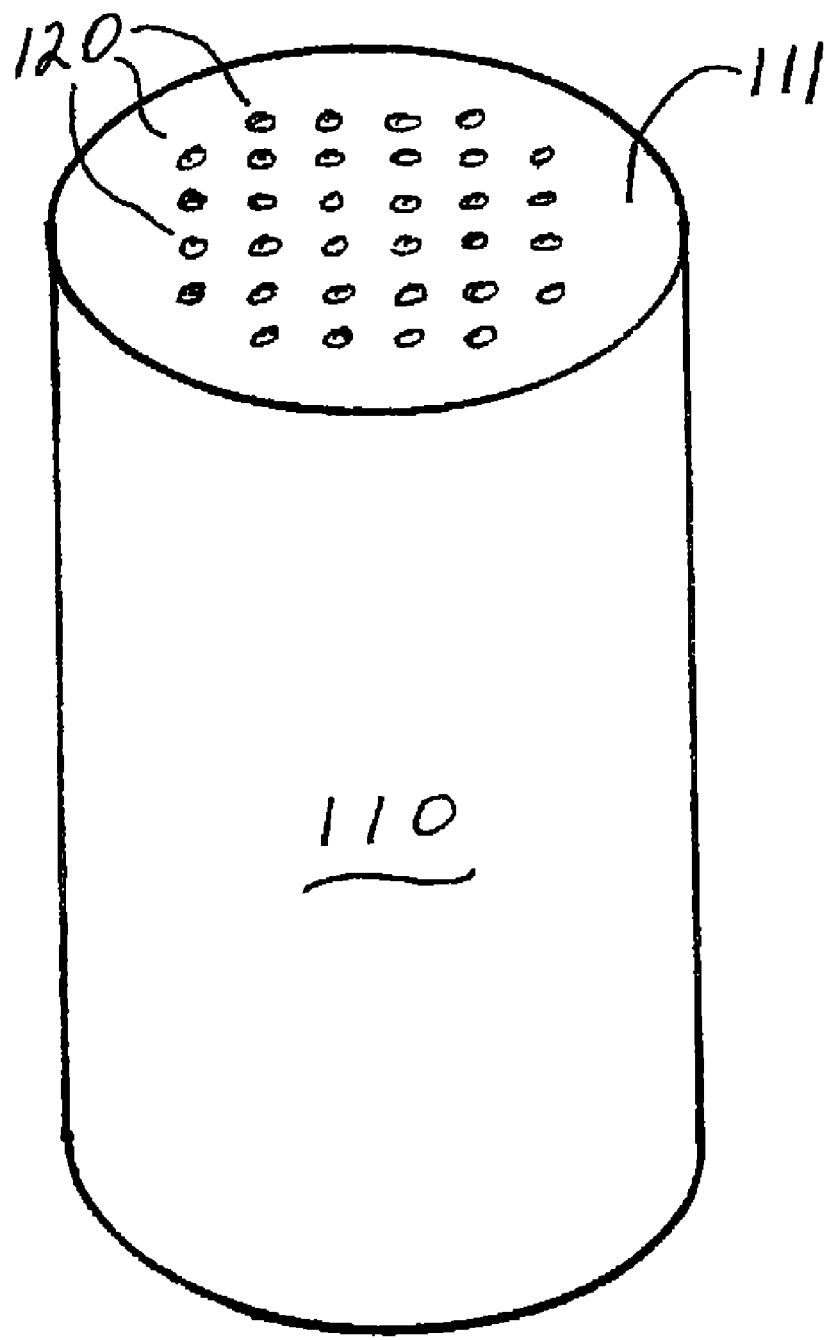
FIG. 3 illustrates a hydrophone array support.

Referring now to FIG. 3, the hydrophone array 110 includes a plurality of hydrophone units 120 arranged parallel to each other in an array which is embedded in a polymeric encapsulant material 111. The hydrophones are sized and spaced for specific target frequencies, e.g., 25 kHz, 20 kHz, 15 kHz. The hydrophones are vertically oriented when fully deployed. The polymeric encapsulant 111 is preferably an acoustically transparent polyurethane, i.e., having the same acoustic impedance as seawater (rho-c material). Polyurethane encapsulants suitable for use in the invention are commercially available from BF Goodrich Co. and other suppliers.

Figure 4A:
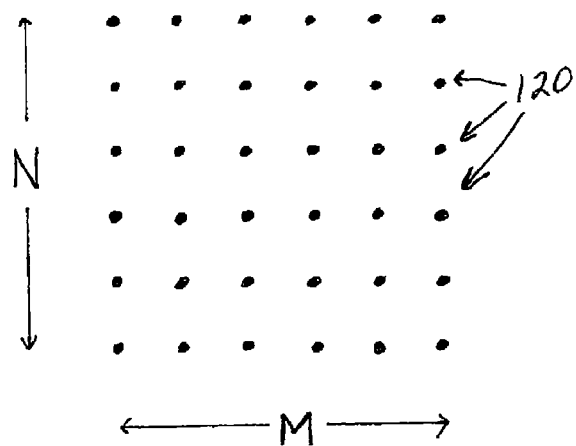
FIG. 4A illustrates an N×M array of hydrophones.
Figure 4B:
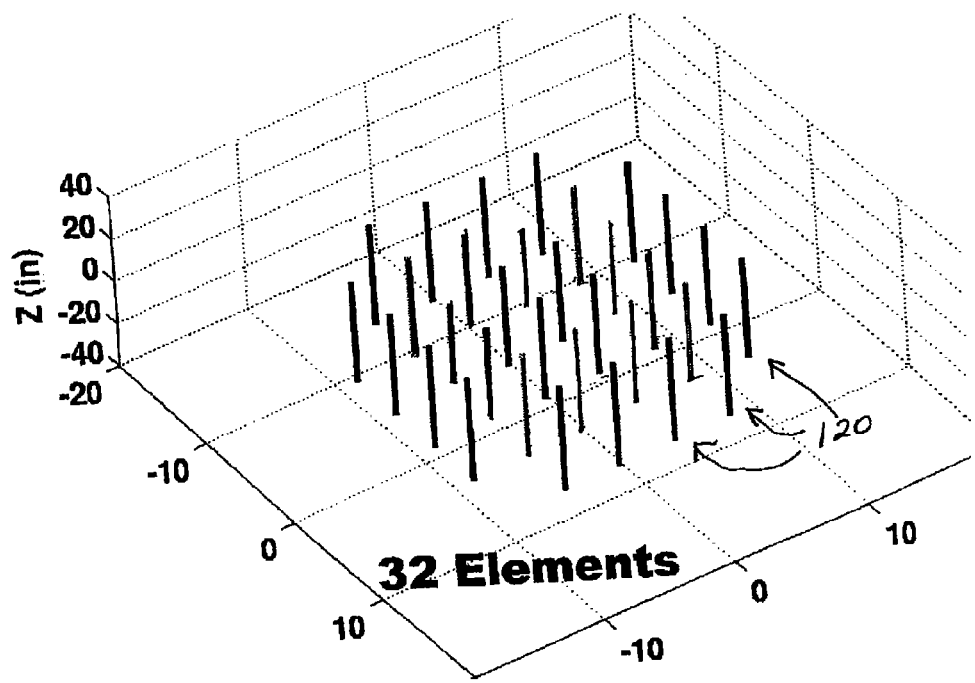
FIG. 4B illustrates an N×M hydrophone array with vacant corner positions.
Figure 5:
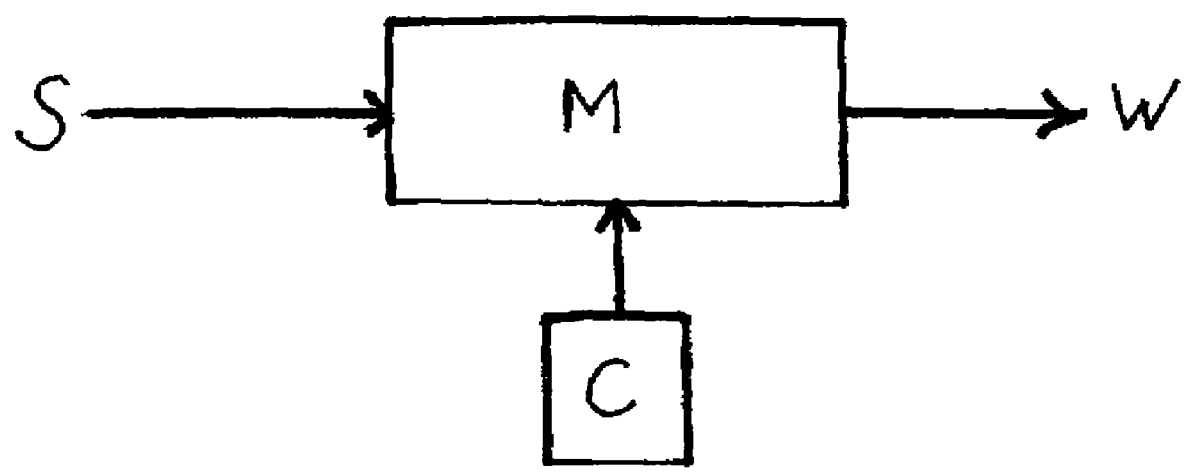
FIG. 5 is a diagram of a system for processing the electrical signals from the hydrophone units.

Referring now to FIGS. 4A and 4B, hydrophone units 120 are deployed in an N×M array wherein N and M are the number of rows and columns, respectively, of positions for hydrophones in a rectangular grid. The distance between adjacent hydrophone units within a row or column is the same. N and M can be the same or different whole numbers and preferably each range from 6 to 10, more preferably 6 to 8, and most preferably 6 or 7. The more hydrophones in the grid the more accurate determination of the direction of the received acoustic signals. However, the more space is needed in the sonobuoy canister to store the array. In a preferred embodiment shown in FIG. 4B a nominal 6×6 grid is altered by leaving the corner positions vacant. The reason for this modification is explained below.

Various types of acoustic transducers can be used to detect acoustic waves transmitted through the water. For example, the acoustic transducer can comprise a tube formed at least in part of a piezo material. Piezo materials can be piezoelectric, which generate an electrical pulse or current upon receiving a mechanical impulse such as from an acoustic vibration, or piezoresistive, which change resistance upon receiving a mechanical impulse. Piezoelectric material can comprise an active polarized ceramic material, such as barium titanate or lead zirconate titanate (PZT). The piezoelectric material can, in another embodiment, be a piezoelectric polymer material, such as polyvinylidene fluoride (PVDF), or a piezo-rubber composite material. Piezoresistive materials include, for example, conductive elastomeric polymeric foams or rubbers which become more conductive when compressed.

Typically, hydrophones include a central or core conductor, an outer conductor, and a layer of piezo material disposed between, and in contact with, the core conductor and outer conductor in a coaxial configuration. When subjected to mechanical force the piezo material, such as polyvinylidene fluoride (PVDF) generates an electrical current which is carried by the conductors. Hydrophone units typically have a diameter of from about 1/10 inch to about 1/8 inch. Hydrophone units suitable for use in the invention are known and commercially available for example from Argotech Inc. of Fort Lauderdale, Fla.

The system 100 is deployed, for example, by launch from an airplane. When the sonobuoy enters the water the contents of the sonobuoy are ejected from the canister. The float remains on the water surface and the deployable array 110 drops to a predetermined depth.

A problem associated with sonar detection using such arrays is the presence of side lobes where partial constructive interference of incoming acoustic waves takes place. The side lobes cause confusion of the signals and it is desirable to suppress the side lobes.

Shading the conventional beamformer of an array can suppress the sidelobe levels. There is a vast variety of line-array (one dimensional) shading functions such as Hanning, Hamming, Blackman, Chebyshev, Gaussian, Kaiser, Bartlett, Hann, Nuttall, Blackman-Harris, modified Bartlett-Hanning, Tukey, Bohman, Parsen and, of course, uniform weighting to name a few. A significant feature of the present invention is the application of two dimensional (2-D) Chebyshev weighting. Full azimuthal coverage without ambiguity may be achieved by applying 2-D Chebyshev weighting to a grid-patterned array of vertical PVDF wires. The advantage of Chebyshev shading is that it offers the ability to control all sidelobes to any desired peak level.

A 2-D gridded array designed for 5 kHz must have an element spacing of half a wavelength at about 7 kHz to mitigate a backlobe ambiguity. In addition, the minimum array size is 6×6 hydrophone units. A smaller array results in the appearance of a backlobe that can't be mitigated with further reduction of hydrophone unit spacing. Applying 2-D Chebyshev weighting to this 6×6 array results in heavily shaded corners that hardly contribute to the array's performance. For example, the corner hydrophone units are shaded to 4% the value of any of the four center elements of a 6×6 array Chebyshev shaded to reduce the sidelobes to 40 dB below the level at the maximum response axis. Therefore, the corner hydrophone units may be omitted from the array to reduce the total number of hydrophone units to 32 in a "trimmed grid array." Elimination of the corner units reduces the computational demand upon the microprocessor. At much lower frequencies, shaded beamforming would result in an omnidirectional beam pattern with no gain against noise. Instead, this array may be processes as a gradient sensor to form a cardioid beam pattern in azimuth to maintain a non-zero array gain.

The 6×6 trimmed grid array consists of 32 elements (hydrophone units) collecting time variability of the received pressure field. Fast Fourier Transform (FFT) of the element-level time series results in the spectral content of the pressure field p across the selected processing time, $$p_n(\omega) = FFT(p_n(t)), \tag{1}$$

where n is the element number from 1 to N=32, p is the dynamic pressure, which is a function of time t and angular frequency ω. A polynomial fit is applied to obtain a simple expression to estimate the flop count of each Fast Fourier Transform (FFT). The number of flops can be estimated using the "flops" command of Matlab (version 5.2).

Element-based adaptive beamforming is applied to each frequency over L number of snapshots, $$R_{nn}(\omega) = \sum_{l=1}^{L} p_{nl}(\omega) p_{nl}^{H}(\omega) \quad (2)$$

where R is the plane-wave reflection coefficient, where water depth H indicates complex conjugate, or Hermitian, transpose of the pressure spectrum. The minimum snapshot duration is approximately given by twice the group delay across the maximum dimension of the array. Since the 22 kHz grid array is about 0.122 meters in diameter, the minimum required snapshot duration is 0.16 ms. If the sample rate of this array is 44 kHz, the minimum snapshot duration correspond to an FFT size of eight samples. The minimum number of snapshots for an accurate estimation of the noise covariance matrix is equivalent to three times the number of array elements for full-rank element-level adaptive beam forming (ABF). Once the covariance matrix is properly estimated, singular value decomposition is applied to predict its eigenvalues and eigenvectors $$R = \sum_{n=1}^{N} \lambda_n v_n v_n^H \quad (3)$$

where $\lambda_n$ and $v_n$ are the nth eigenvalue and eigenvector, respectively.

Since the conventional beam array (CBF) beamwidth of the 2-D Chebyshev-shaded 6×6 grid array is 33 degrees, the number of CBF beams is about 11. However, the beamwidth of an adaptive beamformer is much thinner and the number of beams will definitely increase for complete coverage. Each ABF beam is steered to, $$h = \exp(ik(x\cos(\theta)\cos(\phi) + y\sin(\theta)\cos(\phi) + z\sin(\phi)))$$

where (x,y,z) are the coordinates of each array element, k is the wavenumber, and ($\theta,\phi$) are the beam steering directions in azimuth and elevation, respectively. In the case of the array of vertical wire elements, the elevation is fixed to $\phi=0$. The minimum variance distortionless response (MVDR) beamformer weights with a white-noise gain constraint are given by the elements of, $$w = \frac{(R + \varepsilon I)^{-1} h}{h^H (R + \varepsilon I)^{-1} h}, \quad (4)$$

where I is the identity matrix, $\varepsilon$ is the white noise constraint (usually set to −3 dB), and $$(R + \varepsilon I)^{-1} = \sum_{n=1}^{N} (\lambda + \varepsilon)^{-1} v_n v_n^H. \quad (5)$$

The ABF beam spectra are given by, $$b_n(\omega) = (w p_n(\omega))^2 \quad (6)$$

where an inverse FFT is applied to generate ABF beam-space time series.

If the noise field is cluttered with a non-stationary component caused by a dynamic shipping population, the fastest and nearest ships relative to the array may cross from one narrow ABF beam to others during the integration time required to estimate the full-rank element-level covariance matrix. If the ships are not moving, their energy may be suppressed with just one eigenvalue per ship. However, a moving ship that crosses from beam to beam over the integration time will require more than just one eigenvalue for complete suppression.

To address this problem, reduced-rank adaptive beamforming was introduced. It consists of selection of the 1<L<N largest eigenvalues in Eq. (3) to build a smaller L×L covariance matrix with the purpose of reducing the required number of snapshots and, consequently, reducing the integration time to limit the number of ABF beams ships can cross. The trade-off is that by reducing the size of the covariance matrix, the number of available eigenvalues to suppress the ships is also reduced and only the L loudest ships would be suppressed under the best scenario. Reduced-rank ABF may also be applied to beam-space time-series. Beam-based reduced-rank ABF requires applying a conventional beamformer to the array pressure spectra, $$b_m(\omega) = \sum_{n=1}^{N} h_{mn}(\omega) p_n(\omega) \quad (7)$$

where the steering vector is given by, $$h_{mn}(\omega) = w_n \exp(ik(x_n \cos(\theta_m)\cos(\phi_m) + y_n \sin(\theta_m)\cos(\phi_m) + z_n \sin(\phi_m))) \quad (8)$$

and m represents the beam number from 1 to M. The weights, $w_n$, of the 6×6 trimmed grid array are given by 2-D version of the Chebyshev weights of a line array with −40 dB sidelobe levels, $$w_n = \begin{pmatrix} 0.04 & 0.124 & 0.2 & 0.2 & 0.124 & 0.04 \\ 0.124 & 0.382 & 0.618 & 0.618 & 0.382 & 0.124 \\ 0.2 & 0.618 & 1 & 1 & 0.618 & 0.2 \\ 0.2 & 0.618 & 1 & 1 & 0.618 & 0.2 \\ 0.124 & 0.382 & 0.618 & 0.618 & 0.382 & 0.124 \\ 0.04 & 0.124 & 0.2 & 0.2 & 0.124 & 0.04 \end{pmatrix}. \quad (9)$$

More generally, however, for any size matrix $w_{NM}$ is the inner product of the linear Chebyshev weights in both coordinates: $w_{NM}$=cheb(N×1)×cheb(1×M)

The reduced-rank beam-space covariance matrix is given by, $$R_{mm}(\omega) = \sum_{l=1}^{L} b_{ml}(\omega) b_{ml}^H(\omega) \quad (10)$$

where 1<L<M is the number of snapshots. Singular value decomposition follows, as in Eq. (6) except in beam rather than element space, to obtain the L beam-space eigenvalues and eigenvectors of this covariance matrix. The beam-space pressure spectra are computed by applying the eigenvectors to the CBF vectors, $$d_m(\omega) = v_m b_m(\omega), \quad (11)$$

which is inverse Fourier transformed for the beam-space reduced-rank ABF time-series solution. These are the main operations for flop-count measurement of a weighted conventional beamformer and an element or beam reduced-rank adaptive beamformer.

It can be seen from the array of weights $w_n$ set forth in formula (9) above the weights of the corner positions (0.04) are relatively low with respect to the other. Hence, these corner positions of the 6×6 array need not be occupied by hydrophones. The elimination of the corner hydrophones reduces the number of required hydrophones from 36 to 32, with little loss of accuracy, thereby saving valuable space so as to allow the array to be packed within a size A sonobuoy canister. Moreover, the shaded beamforming described above with reduced number of hydrophone units reduces the computational demand on the microprocessor.

The final 6×6 grid array configuration is illustrated in FIG. 4B. The on axis sidelobes are reduced to −40 dB. The sidelobes along elevation from the main lobe can't be suppressed through shading because the length of the vertical wires is uniform in thickness and sensitivity. These sidelobes could potentially limit the array's ability to fully exploit the vertical noise anisotropy. However, they do not degrade the array's ability to mitigate the nearby ship interference through the sidelobes.

Conventional computer control systems can be used to process the electrical signals from hydrophones 120 using the 2D Chebyshev weighting. Referring to FIG. 6, electrical signals S from the hydrophone units are sent to a microprocessor M which applies 2-D Chebyshev weighting C to the individual hydrophone signals, as described above, the strength of each signal being adjusted by the corresponding weighting value $w_n$ to produce weighted signals W. Microprocessor M performs the beamforming computations of formula (11) above to provide accurate directional information regarding, for example, submarine vessels.

While the above description contains many specifics, these specifics should not be construed as limitations of the invention, but merely as exemplifications of preferred embodiments thereof. For example, while the invention herein is particularly advantageous for military applications and has been described in terms of detection of submarines, it can clearly be employed in any situation wherein acoustic detection is needed, such as oceanographic or other scientific studies, rescue operations, and the like. Those skilled in the art will envision many other embodiments within the scope and spirit of the invention as defined by the claims appended hereto.

What is claimed is:

1. A sonar system for detecting underwater acoustic signals, which comprises:
    a plurality of hydrophone units capable of converting acoustic impulses to electrical signals, said hydrophone units being substantially vertically oriented when deployed in a body of water, and said hydrophone units occupying at least some of the positions of an N×M rectangular horizontal array wherein N is the number of rows and M is the number of columns in the array,
        wherein corner positions of the rectangular horizontal array are not occupied by hydrophone units, and
        wherein the rectangular horizontal array having corner positions not occupied by hydrophone units is embedded in a polymeric encapsulant;
    electronics, including a processor, for applying two-dimensional Chebyshev mathematical weighting to the electrical signals from the individual hydrophone units such that each individual signal from each hydrophone unit is assigned a respective weighting number according to its position in the rectangular horizontal array and a numerical value is assigned to each individual signal corresponding to the strength of the electrical signal as adjusted by the respective weighting number; and
    a canister in which the hydrophone units are loaded and from which said hydrophone units are deployed into the body of water.

2. The sonar system of claim 1 wherein a weighting number $w_{NM}$ for each individual hydrophone unit is the inner product of the linear Chebyshev weights in both coordinates according to the formula: $w_{NM}=\text{cheb}(N\times1)\times\text{cheb}(1\times M)$.

3. The sonar system of claim 1 wherein the N×M array is a 6×6 array.

4. The sonar system of claim 3 wherein the weighting number for each individual hydrophone unit signal has a value $w_n$ as determined by the formula grid $$w_n = \begin{pmatrix} 0.04 & 0.124 & 0.2 & 0.2 & 0.124 & 0.04 \\ 0.124 & 0.382 & 0.618 & 0.618 & 0.382 & 0.124 \\ 0.2 & 0.618 & 1 & 1 & 0.618 & 0.2 \\ 0.2 & 0.618 & 1 & 1 & 0.618 & 0.2 \\ 0.124 & 0.382 & 0.618 & 0.618 & 0.382 & 0.124 \\ 0.04 & 0.124 & 0.2 & 0.2 & 0.124 & 0.04 \end{pmatrix}.$$

5. The sonar system of claim 4 wherein beam sidelobes are reduced by −40 dB.

6. The sonar system of claim 1 wherein the processor for applying the two-dimensional Chebyshev mathematical weighting includes a microprocessor.

7. The sonar system of claim 1 wherein the polymeric encapsulant is a polyurethane having the same acoustic impedance as seawater.

8. The sonar system of claim 1 wherein the hydrophone units include polyvinylidene fluoride.

* * * * *